(12) United States Patent
Jang

(10) Patent No.: US 8,872,452 B2
(45) Date of Patent: Oct. 28, 2014

(54) METHOD FOR OPERATING MOTOR OF MOTOR-DRIVEN POWER STEERING

(71) Applicant: Hyundai Mobis Co., Ltd., Seoul (KR)

(72) Inventor: Seok Hwan Jang, Suwon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 176 days.

(21) Appl. No.: 13/727,382

(22) Filed: Dec. 26, 2012

(65) Prior Publication Data

US 2013/0328509 A1 Dec. 12, 2013

(30) Foreign Application Priority Data

Jun. 8, 2012 (KR) .................. 10-2012-0061769

(51) Int. Cl.
*H02P 6/00* (2006.01)

(52) U.S. Cl.
CPC ...................... *H02P 6/001* (2013.01)
USPC .................. 318/400.02; 318/400.01; 318/700

(58) Field of Classification Search
CPC ...................................... H02P 6/001
USPC ............................ 318/400.02, 400.01, 700
See application file for complete search history.

(56) References Cited

U.S. PATENT DOCUMENTS 6,984,948 B2 * 1/2006 Nakata et al. ............ 318/400.02

* cited by examiner

Primary Examiner — David S Luo
(74) Attorney, Agent, or Firm — Knobbe Martens Olson & Bear LLP

(57) ABSTRACT

A method for operating a motor of a motor-driven power steering (MDPS) includes: generating, by an inverter operating unit, a two-phase operation command by projecting a Q-axis command onto a two-phase operation axis, when an error occurs in any one of three phases; converting, by the inverter operating unit, coordinates of the two-phase operation command into an actual operation axis; calculating, by the inverter operating unit, a two-phase operation voltage by performing proportional integral (PI) control on the two-phase operation command converted into the actual operation axis; and operating, by the inverter diving unit, a motor by applying the two-phase operation voltage to an inverter unit.

12 Claims, 12 Drawing Sheets

METHOD FOR OPERATING MOTOR OF MOTOR-DRIVEN POWER STEERING

CROSS-REFERENCES TO RELATED APPLICATIONS

The present application claims priority to Korean application number 10-2012-0061769, filed on Jun. 8, 2012, which is incorporated by reference in its entirety.

BACKGROUND OF THE INVENTION

The present invention relates to a method for operating a motor of a motor-driven power steering (MDPS), and more particularly, to a method for operating a motor of an MDPS, in which when an error occurs in any one of three phases in an inverter circuit of the MDPS, the other two phases are used to drive a motor so as to maintain an assist power.

In general, a MDPS provides an assist torque in a driver's steering direction using an electric motor such that the driver smoothly handles a steering wheel.

The MDPS automatically controls the operation of the electric motor according to a driving condition of a vehicle, unlike an existing hydraulic power steering (HPS). Therefore, the MDPS may improve the steering performance and steering feeling.

Typically, the MDPS drives a three-phase motor to provide an assist power. Therefore, the MDPS includes an inverter circuit for operating the three-phase motor.

When an error occurs in any one phase of the inverter circuit while the vehicle is driven, an improper assist power may be provided to interfere with driver's steering. Therefore, the MDPS is switched to a manual mode.

However, when the MDPS is suddenly switched to the manual mode, providing the assist power is suddenly stopped. Therefore, the driver may feel a significantly different steering feeling.

For example, when the MDPS is suddenly switched to the manual mode in a state where the vehicle is cornering at a low speed, the steering feeling felt by the driver suddenly gets heavy so as to degrade the driving safety of the vehicle. In this case, an accident may occur.

Furthermore, in order to block the phase of the inverter circuit where an error occurred, a relay and a capacitor must be used. Therefore, the cost inevitably increases.

SUMMARY OF THE INVENTION

Embodiments of the present invention are directed to a method for operating a motor of an MDPS, in which when an error occurs in any one phase in an inverter circuit of the MDPS, the other two phases are used to maintain an assist power, thereby preventing a driver from feeling a different steering feeling and securing the driving safety of a vehicle.

In one embodiment, a method for operating a motor of an MDPS includes: generating, by an inverter operating unit, a two-phase operation command by projecting a Q-axis command onto a two-phase operation axis, when an error occurs in any one of three phases; converting, by the inverter operating unit, coordinates of the two-phase operation command into an actual operation axis; calculating, by the inverter operating unit, a two-phase operation voltage by performing proportional integral (PI) control on the two-phase operation command converted into the actual operation axis; and operating, by the inverter diving unit, a motor by applying the two-phase operation voltage to an inverter unit.

In the generating of the two-phase operation command, the two-phase operation command may be decided by the other two phases in which no errors occur among the three phases.

In the generating of the two-phase operation command, the two-phase operation command may be decided based on the rotation angle of a D-axis.

In the calculating of the two-phase operation voltage, the PI control may be performed by open loop control.

In the calculating of the two-phase operation voltage, the two-phase operation voltage may be calculated by reflecting reverse-electromotive-force feedforward compensation into the result obtained by performing the PI control.

The PI control and the reverse-electromotive-force feedforward compensation may be performed based on a two-phase voltage equation of the motor.

In the operating of the motor, an assist power generated by the rotation of the motor may be smaller than an assist power when all of the three phases are normal.

In the operating of the motor, the inverter operating unit may convert the two-phase operation voltage into a pulse width modulation (PWM) signal, and apply the converted PWM signal.

In the operating of the motor, an output current of the motor may be restricted to a predetermined reference value or less.

The motor may include a surface-mounted permanent magnet synchronous motor (SPMSM).

DESCRIPTION OF SPECIFIC EMBODIMENTS

Hereinafter, exemplary embodiments of the present invention will be described in detail with reference to the accompanying drawings.

Figure 1:
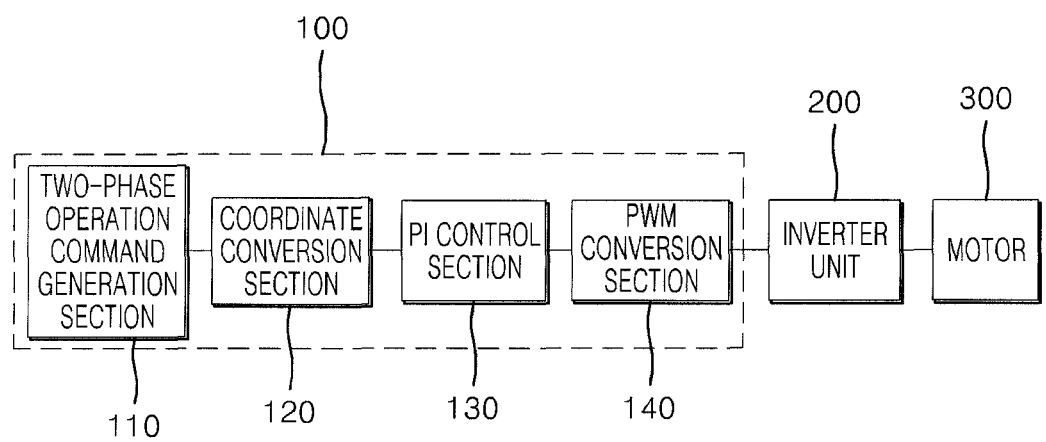
FIG. 1 is a block diagram illustrating an apparatus for performing a method for operating a motor of an MDPS in accordance with an embodiment of the present invention.
Figure 2:
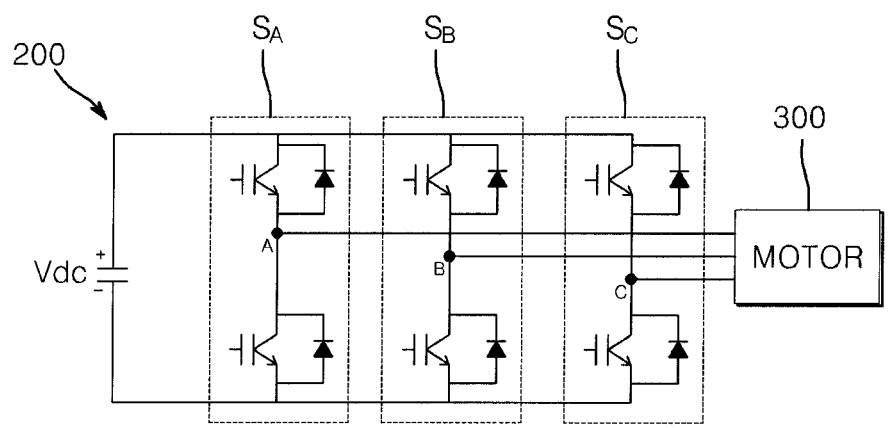
FIG. 2 is a diagram illustrating a circuit configuration of an inverter unit in connection with the method for operating a motor of an MDPS in accordance with the embodiment of the present invention.
Figure 3A:
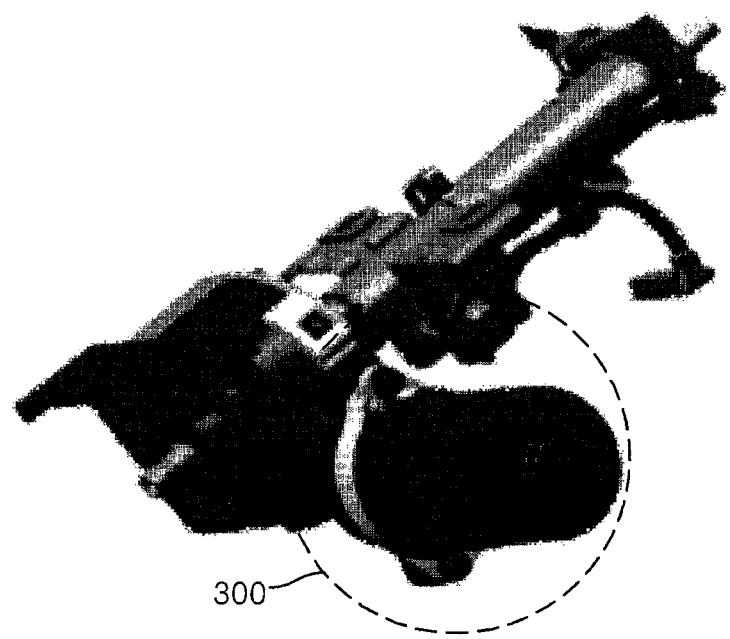
FIGS. 3A and 3B illustrate a motor in connection with the method for operating a motor of an MDPS in accordance with the embodiment of the present invention.
Figure 3B:
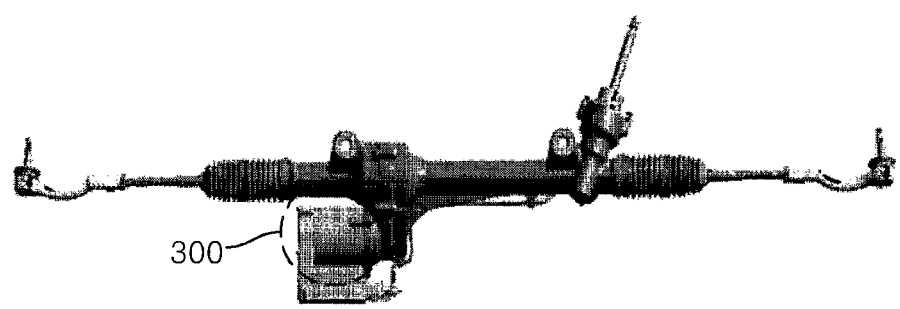

FIG. 1 is a block diagram illustrating an apparatus for performing a method for operating a motor of an MDPS in accordance with an embodiment of the present invention. FIG. 2 is a diagram illustrating a circuit configuration of an inverter unit in connection with the method for operating a motor of an MDPS in accordance with the embodiment of the present invention. FIGS. 3A and 3B are diagrams illustrating a motor in connection with the method for operating a motor of an MDPS in accordance with the embodiment of the present invention.

Referring to FIG. 1, the apparatus for performing the method for operating a motor of an MDPS in accordance with the embodiment of the present invention includes an inverter operating unit 100, an inverter unit 200, and a motor 300.

Typically, the MDPS calculates an assist torque based on an steering angle, a steering torque, and a vehicle speed, which are inputted from an steering angle sensor (not illustrated), a torque sensor (not illustrated), a vehicle speed sensor (not illustrated), and provides an assist power by operating the motor 300 according to the calculated assist torque.

When the motor 300 is driven under a normal condition, the inverter operating unit 100 generates a three-phase operation command based on a D-axis command and a Q-axis command, and drives the motor 300 by applying a three-phase operation voltage based on the three-phase operation command to the inverter unit 200.

However, when an error occurs in any one phase of the three phases, the inverter operating unit 110 in accordance with the embodiment of the present invention generates a two-phase operation command based on the Q-axis command. The inverter operating unit 110 performs coordinate conversion and proportional integral control (PI control) on the generated two-phase operation command so as to calculate a two-phase operation voltage.

Then, the inverter operating unit 100 converts the calculated two-phase operation voltage into a pulse width modulation (PWM) signal and applies the PWM signal to the inverter unit 200.

That is, although an error occurs in any one of three phases, the inverter operating unit 100 does not stop providing an assist power, but drives the motor 300 using the other two phases, thereby maintaining a constant level of assist power.

The inverter operating unit 100 includes a two-phase operation command generation section 110, a coordinate conversion section 120, a PI control section 130, and a PWM conversion section 140.

The two-phase operation command generation section 110 projects the Q-axis command onto the two-phase operation axis and generates a two-phase operation command.

The coordinate conversion section 120 converts the coordinates of the two-phase operation command into an actual operation axis.

The PI control section 130 performs PI control on the converted two-phase operation command so as to calculate a two-phase operation voltage.

The PWM conversion section 140 converts the two-phase operation voltage into a PWM signal.

The process in which the inverter operating unit 100 generates the two-phase operation command based on the Q-axis command and calculates the two-phase operation voltage using the generated two-phase operation command will be described in detail with reference to FIGS. 4 to 11.

The inverter unit 200 drives the motor 300 according to the two-phase operation voltage applied from the inverter operating unit 100.

Referring to FIG. 2, the inverter unit 200 may include six switch elements $S_A$, $S_B$, and $S_C$. The two switch elements $S_A$ are connected to an A-phase, the two switch elements $S_B$ are connected to a B-phase, and the two switch elements $S_C$ are connected to a C-phase.

The switch element may include various switch elements such as an insulated gate bipolar mode transistor (IGBT), a field effect transistor (FET), a bipolar junction transistor (BIT), a silicon-controlled rectifier (SCR) and the like.

The motor 300 generates a torque according to the two-phase operation voltage applied from the inverter unit 200.

The motor 300 may be attached to a column of the MDPS as illustrated in FIG. 3A, and may be attached to a rack of the MDPS as illustrated in FIG. 3B.

That is, the method for operating a motor of an MDPS in accordance with the embodiment of the present invention may be applied to a column motor-driven power steering (CMDPS) which includes the motor 300 attached to a column thereof and providing an assist power and a rack motor-driven power steering (RMDPS) which includes the motor 300 attached to a rack thereof and providing an assist power.

Figure 4:
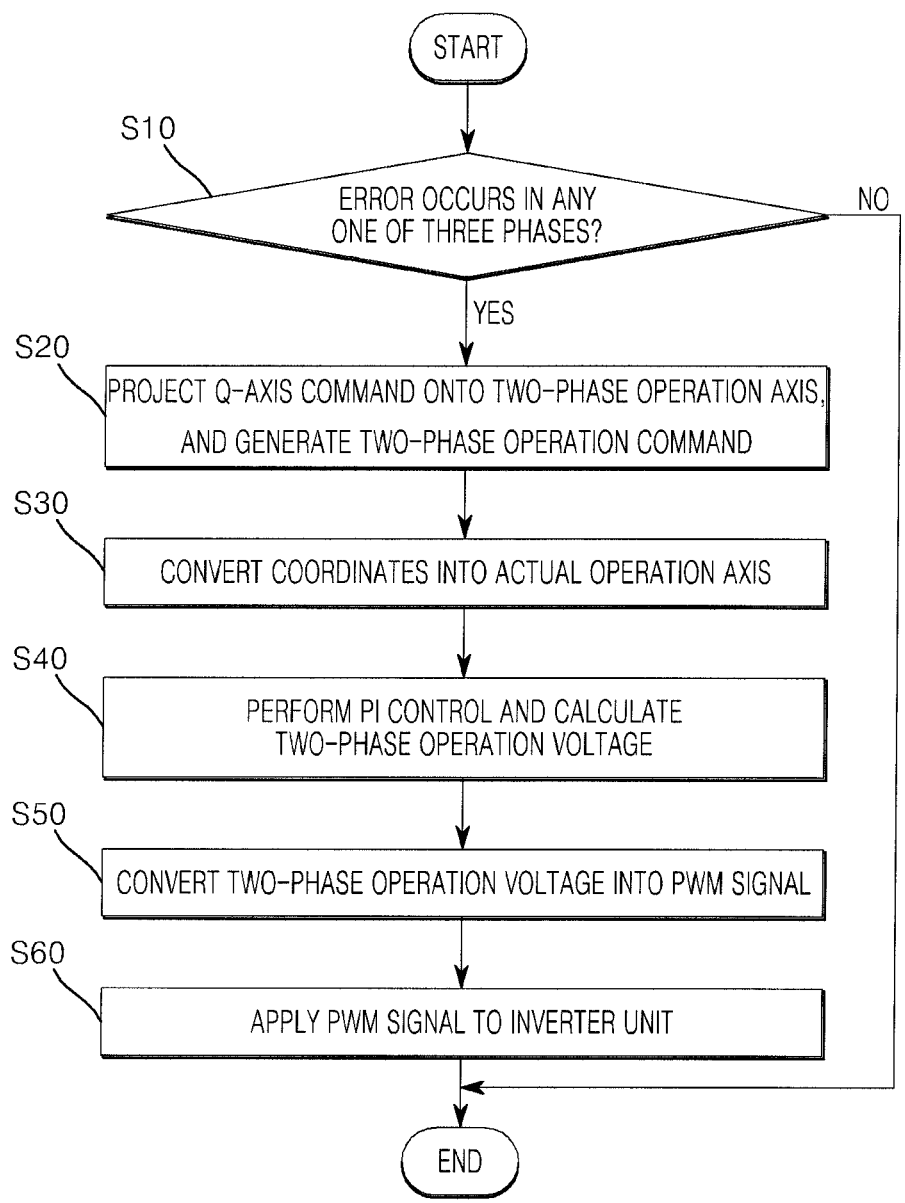
FIG. 4 is a flow chart showing the method for operating a motor of an MDPS in accordance with the embodiment of the present invention.

FIG. 4 is a flow chart showing the method for operating a motor of an MDPS in accordance with the embodiment of the present invention.

Figure 5A:
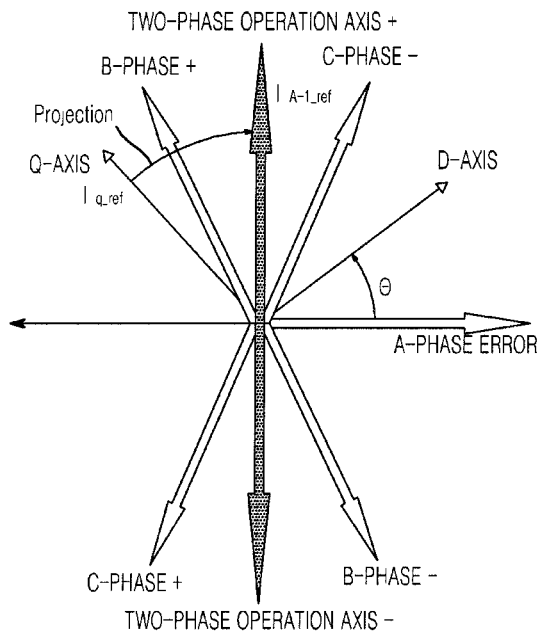
FIGS. 5A and 5B are diagrams for explaining a process in which when an error occurs in an A-phase, a Q-axis command is projected onto the two-phase operation axis in the method for operating a motor of an MDPS in accordance with the embodiment of the present invention.
Figure 5B:
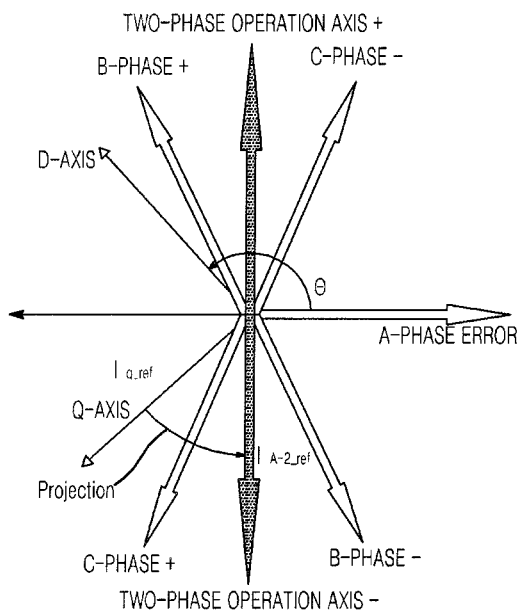
Figure 6A:
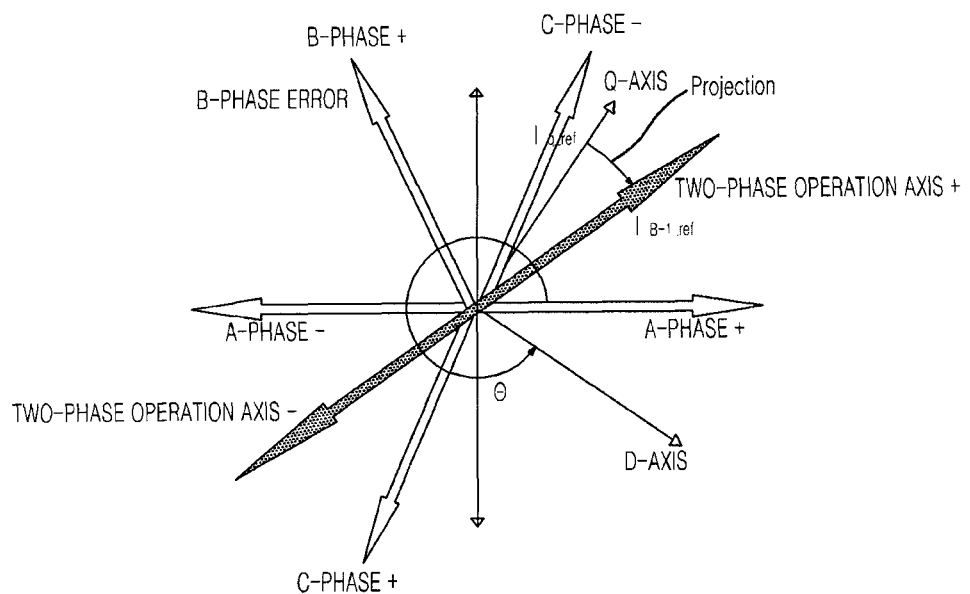
FIGS. 6A and 6B are diagrams for explaining a process in which when an error occurs in a B-phase, the Q-axis command is projected on the two-phase operation axis in the method for operating a motor of an MDPS in accordance with the embodiment of the present invention.
Figure 6B:
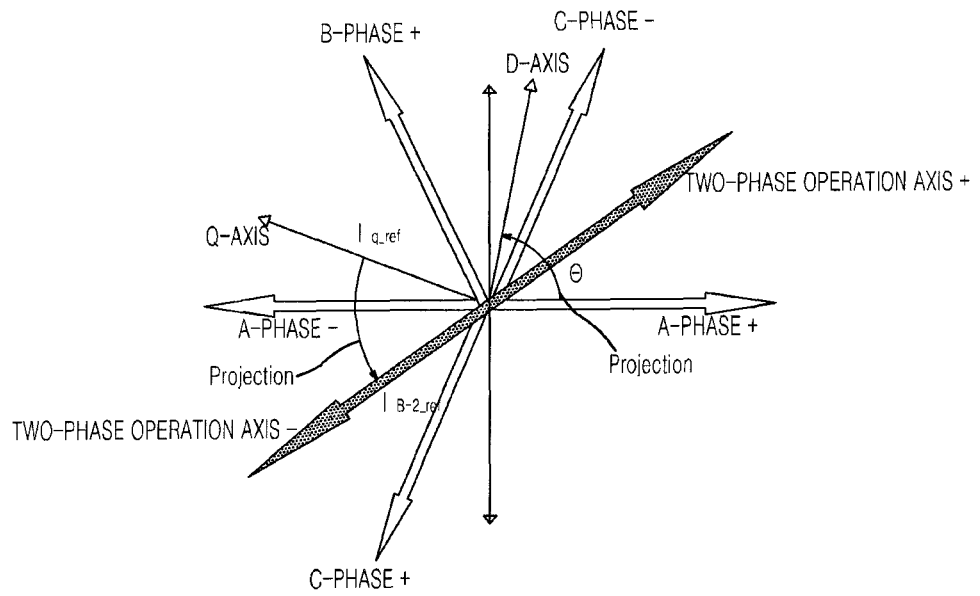
Figure 7A:
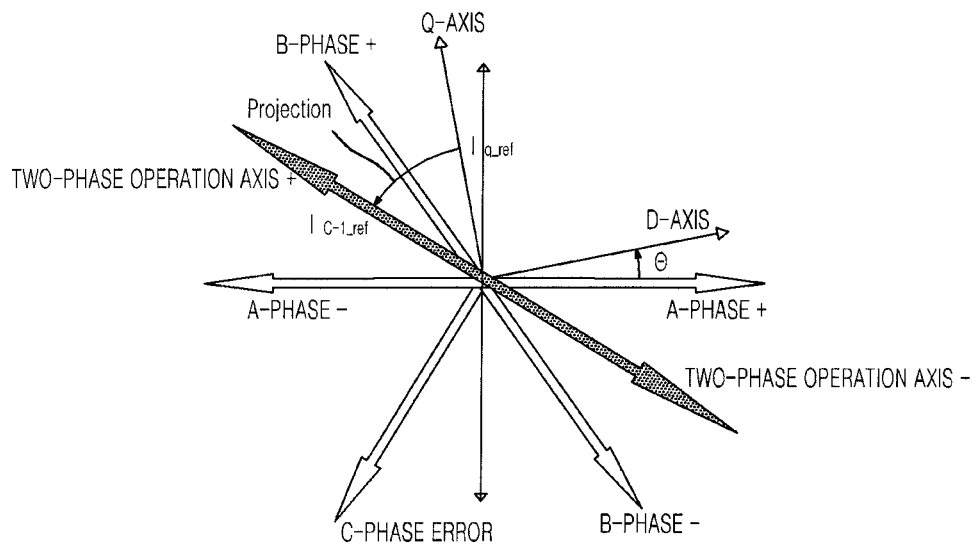
FIGS. 7A and 7B are diagrams for explaining a process in which when an error occurs in a C-phase, the Q-axis command is projected on the two-phase operation axis in the method for operating a motor of an MDPS in accordance with the embodiment of the present invention.
Figure 7B:
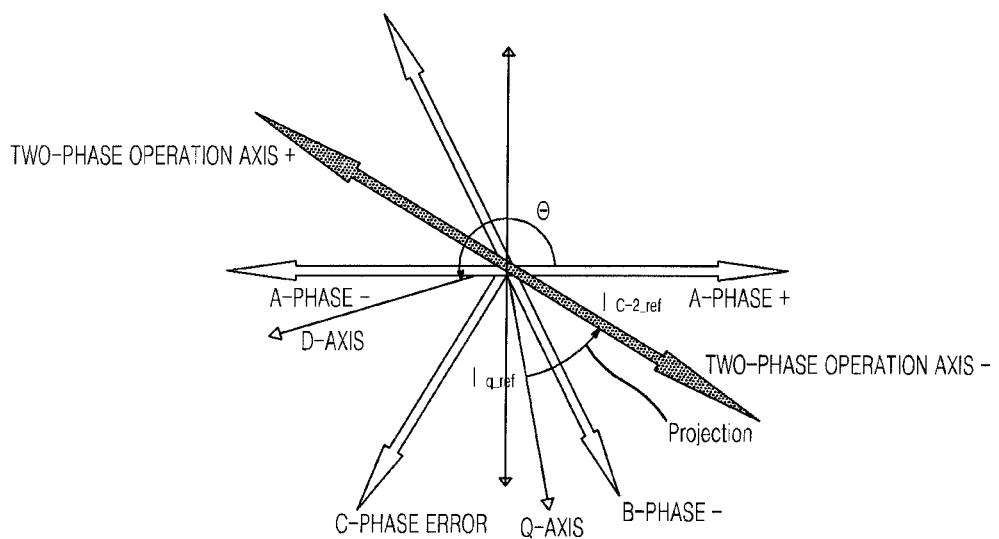

FIGS. 5A and 5B are diagrams for explaining a process in which when an error occurs in an A-phase, the Q-axis command is projected onto the two-phase operation axis in the method for operating a motor of an MDPS in accordance with the embodiment of the present invention. FIGS. 6A and 6B are diagrams for explaining a process in which when an error occurs in a B-phase, the Q-axis command is projected on the two-phase operation axis in the method for operating a motor of an MDPS in accordance with the embodiment of the present invention. FIGS. 7A and 7B are diagrams for explaining a process in which when an error occurs in a C-phase, the Q-axis command is projected on the two-phase operation axis in the method for operating a motor of an MDPS in accordance with the embodiment of the present invention.

Referring to FIG. 4, the inverter operating unit 100 checks whether or not an error occurs in any one of three phases, at step S10.

When one or more of the switch elements provided in the inverter unit 200 are damaged and an error occurs in any one of three phases, the two-phase operation command generation section 110 of the inverter operating unit 100 projects the Q-axis command onto the two-phase operation axis and generates the two-phase operation command, at step S20.

Here, the two-phase operation axis indicates an axis formed by the other two phases in which no error occurs among the three phases. Since a new two-phase operation axis formed by two phases is limited to one, the two-phase operation command generation section 110 generates the two-phase operation command using only the Q-axis command.

For example, when an error occurs in the A-phase as illustrated in FIGS. 5A and 5B, the two-phase operation command generation section 110 may project the Q-axis command onto a two-phase operation axis formed by the B-phase and the C-phase, and generate two-phase operation commands $I_{A-1\_ref}$ and $I_{A-2\_ref}$. In FIGS. 5A and 5B, θ represents a rotation angle of the D-axis. In this embodiment of the present invention, suppose that a counterclockwise rotation direction is a positive rotation direction.

FIG. 5A illustrates the two-phase operation command $I_{A-1\_ref}$ when the rotation angle θ of the D-axis ranges from 0 to 90 degrees or ranges from 270 to 360 degrees (0°<θ≤90° or 270°<θ≤360°). FIG. 5B illustrates the two-phase operation command $I_{A-2\_ref}$ when the rotation angle θ of the D-axis ranges from 90 to 270 degrees) (90°<θ≤270°).

The two-phase operation commands $I_{A-1\_ref}$ and $I_{A-2\_ref}$ generated when an error occurs in the A-phase may be expressed as Equation 1 below. Here, $I_{q\_ref}$ represents the Q-axis command.

$$I_{A-1\_ref} = \frac{I_{q\_ref}}{\cos(\theta)}, I_{A-2\_ref} = \frac{I_{q\_ref}}{\cos(\theta - 180)} \quad \text{[Equation 1]}$$

Furthermore, when an error occurs in the B-phase or C-phase, the two-phase operation command generation section 110 may generate a two-phase operation command in the same manner.

First, when an error occurs in the B-phase as illustrated in FIGS. 6A and 6B, the two-phase operation command generation section 110 may project the Q-axis command onto a two-phase operation axis formed by the A-phase and the C-phase and generate two-phase operation commands $I_{B-1\_ref}$ and $I_{B-2\_ref}$.

FIG. 6A illustrates the two-phase operation command $I_{B-1\_ref}$ when the rotation angle θ of the D-axis ranges from 0 to 30 degrees or ranges from 210 to 360 degrees (0°<θ≤30° or 210°<θ≤360°). FIG. 6B illustrates the two-phase operation command $I_{B-2\_ref}$ when the rotation angle θ of the D-axis ranges from 30 to 210 degrees) (30°<θ≤210°).

The two-phase operation commands $I_{B-1\_ref}$ and $I_{B-2\_ref}$ generated when an error occurs in the B-phase may be expressed as Equation 2 below.

$$I_{B-1\_ref} = \frac{I_{q\_ref}}{\cos(\theta - 300)}, I_{B-2\_ref} = \frac{I_{q\_ref}}{\cos(\theta - 120)} \quad \text{[Equation 2]}$$

Furthermore, when an error occurs in the C-phase as illustrated in FIGS. 7A and 7B, the two-phase operation command generation section 110 may project the Q-axis command onto a two-phase operation axis formed by the A-phase and the B-phase and generate two-phase operation commands $I_{C-1\_ref}$ and $I_{C-2\_ref}$.

FIG. 7A illustrates the two-phase operation command $I_{C-1\_ref}$ when the rotation angle θ of the D-axis ranges from 0 to 150 degrees or ranges from 330 to 360 degrees (0°<θ≤150° or 330°<θ≤360°). FIG. 7B illustrates the two-phase operation command $I_{C-2\_ref}$ when the rotation angle θ of the D-axis ranges from 150 to 330 degrees) (150°<θ≤330°).

The two-phase operation commands $I_{C-1\_ref}$ and $I_{C-2\_ref}$ generated when an error occurs in the C-phase may be expressed as Equation 3 below.

$$I_{C-1\_ref} = \frac{I_{q\_ref}}{\cos(\theta - 60)}, I_{C-2\_ref} = \frac{I_{q\_ref}}{\cos(\theta - 240)} \quad \text{[Equation 3]}$$

Table 1 shows the two-phase operation commands generated when an error occurs in the respective phases.

TABLE 1

| Error type | θ (deg) | Two-phase operation command |
|---|---|---|
| A-phase error | 0 < θ ≤ 90 or 270 < θ ≤ 360 | $I_{A-1\_ref} = \frac{I_{q\_ref}}{\cos(\theta)}$ |
|  | 90 < θ ≤ 270 | $I_{A-2\_ref} = \frac{I_{q\_ref}}{\cos(\theta - 180)}$ |
| B-phase error | 0 < θ ≤ 30 or 210 < θ ≤ 360 | $I_{B-1\_ref} = \frac{I_{q\_ref}}{\cos(\theta - 300)}$ |
|  | 30 < θ ≤ 210 | $I_{B-2\_ref} = \frac{I_{q\_ref}}{\cos(\theta - 120)}$ |
| C-phase error | 0 < θ ≤ 150 or 330 < θ ≤ 360 | $I_{C-1\_ref} = \frac{I_{q\_ref}}{\cos(\theta - 60)}$ |
|  | 150 < θ ≤ 330 | $I_{C-2\_ref} = \frac{I_{q\_ref}}{\cos(\theta - 240)}$ |

Figure 8:
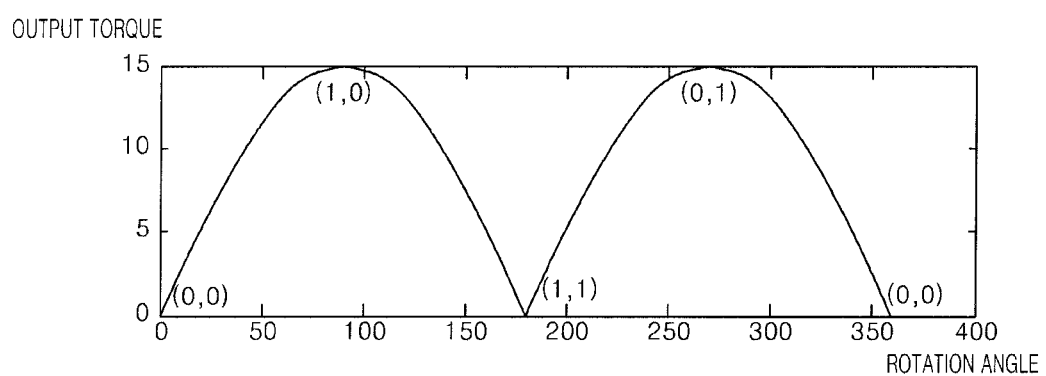
FIG. 8 is a graph illustrating the relation between the Q-axis and the two-phase operation in the method for operating a motor of an MDPS in accordance with the embodiment of the present invention.
Figure 9:
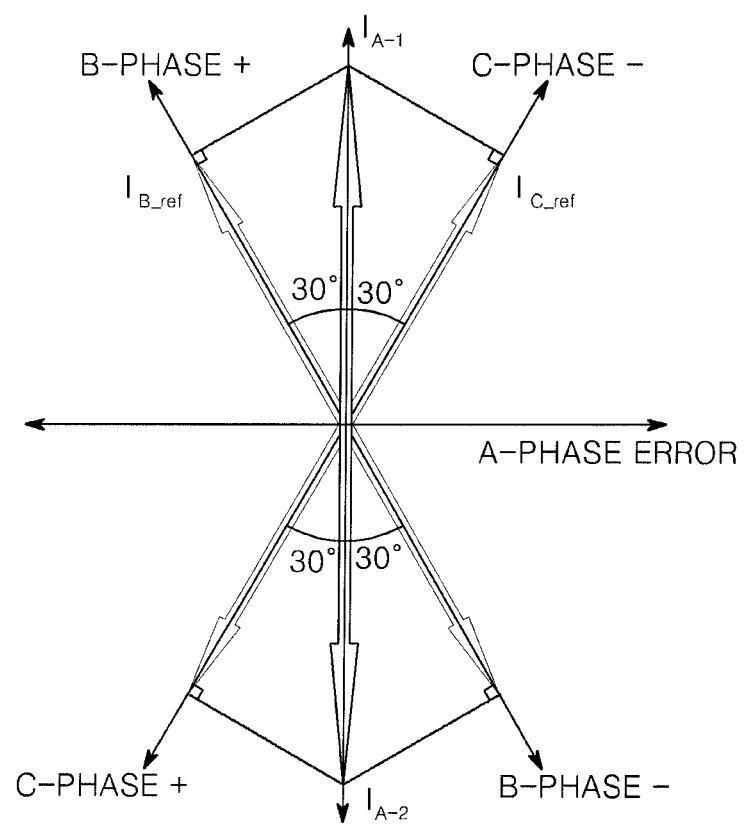
FIG. 9 is a diagram for explaining a process in which coordinate conversion is performed in the method for operating a motor of an MDPS in accordance with the embodiment of the present invention.

FIG. 8 is a graph illustrating the relation between the Q-axis and the two-phase operation in the method for operating a motor of an MDPS in accordance with the embodiment of the present invention. FIG. 9 is a diagram for explaining the process in which coordinate conversion is performed in the method for operating a motor of an MDPS in accordance with the embodiment of the present invention.

Figure 10A:
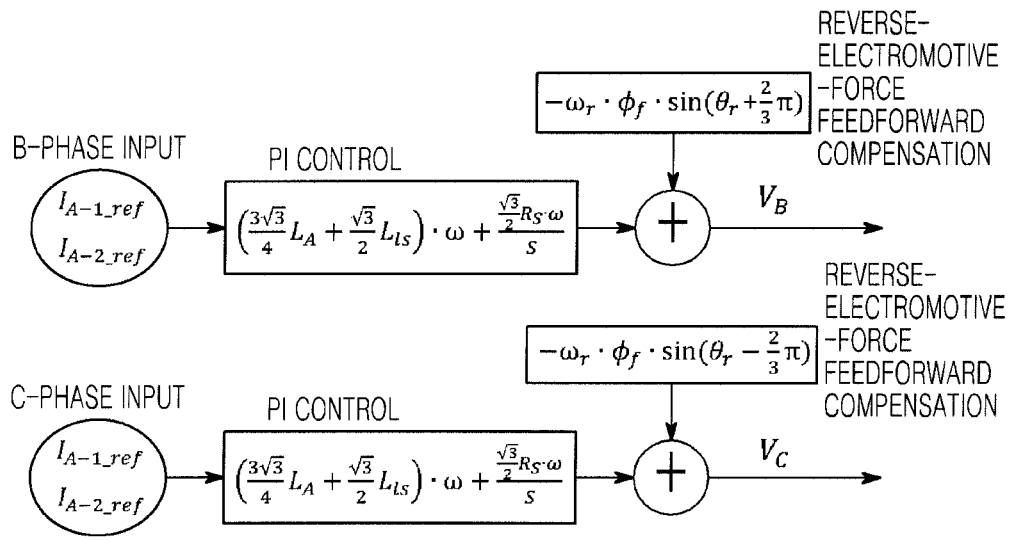
FIGS. 10A, 10B and 10C are diagrams for explaining a process in which PI control is performed in the method for operating a motor of an MDPS in accordance with the embodiment of the present invention.
Figure 10B:
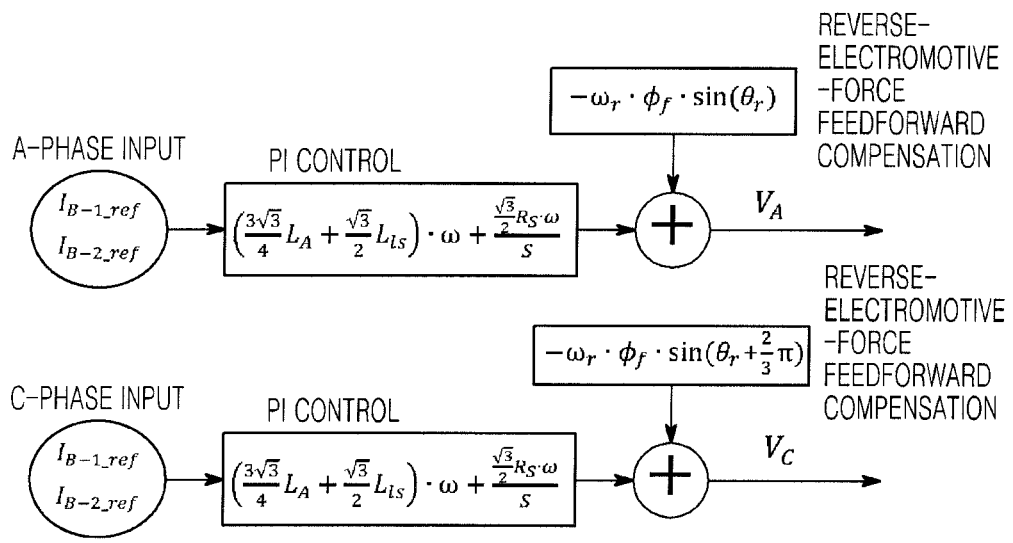
Figure 10C:
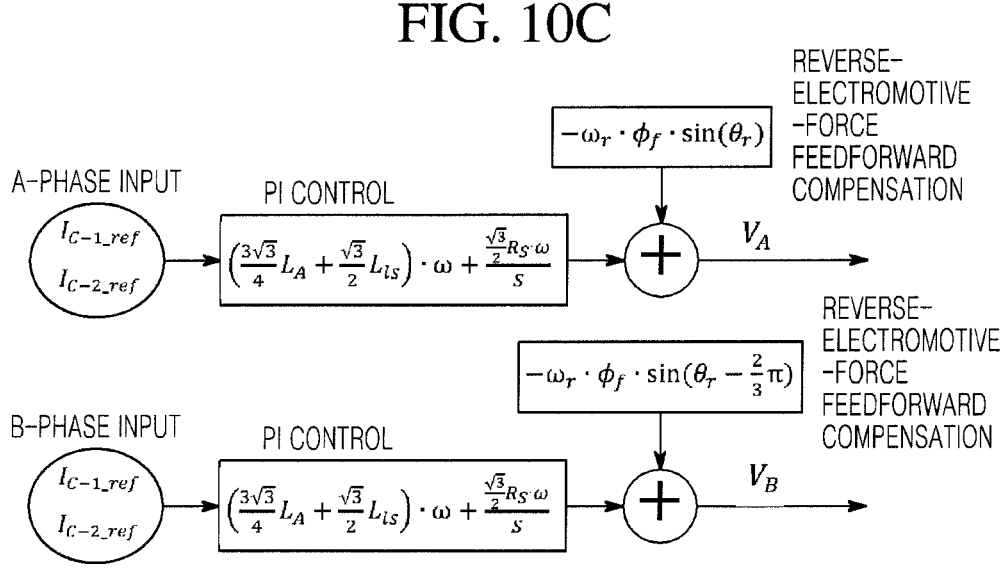
Figure 11A:
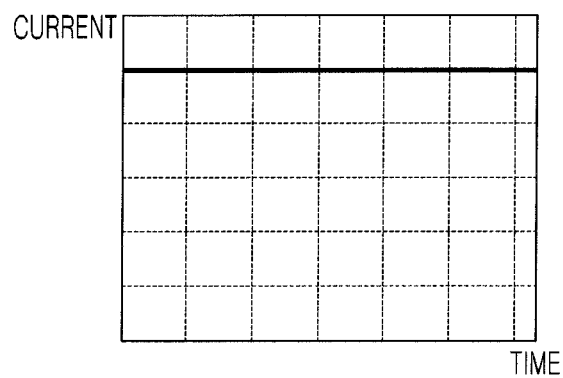
FIGS. 11A and 11B are diagrams illustrating an output of the motor in accordance with the method for operating a motor of an MDPS in accordance with the embodiment of the present invention.
Figure 11B:
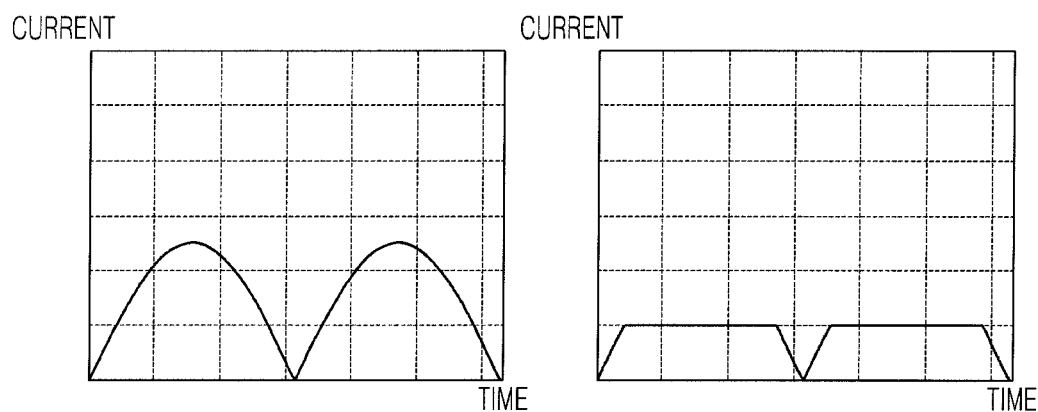

FIGS. 10A, 10B and 10C are diagrams for explaining the process in which PI control is performed in the method for operating a motor of an MDPS in accordance with the embodiment of the present invention. FIGS. 11A and 11B are diagrams illustrating an output of a motor in accordance with the method for operating a motor of an MDPS in accordance with the embodiment of the present invention.

Table 2 shows the relation between the Q-axis command and the two-phase operation, and FIG. 8 illustrates the relation using a graph.

Referring to FIG. 8, the two-phase operation is implemented with only four switch elements excluding one phase from existing six switch elements, and may be set to (0,0)→(1,0)→(1,1)→(0,1) according to combinations in which the switch elements are turned on/off.

TABLE 2

| Phase difference (deg) between Q-axis and two-phase operation axis | 0 | 90 | 180 | 270 |
|---|---|---|---|---|
| 1-phase FET | 0 | 1 | 1 | 0 |
| 2-phase FET | 0 | 0 | 1 | 1 |

Referring to FIG. 4, after the two-phase operation command for the two-phase operation axis is generated, the coordinate conversion section 120 of the inverter operating unit 100 converts the coordinates of the two-phase operation command into an actual operation axis, at step S30.

For example, when an error occurs in the A-phase as illustrated in FIG. 9, the coordinate conversion section 120 converts the two-phase operation commands $I_{A-1\_ref}$ and $I_{A-2\_ref}$ for the two-phase operation axis into commands $I_{B\_ref}$ and $I_{C\_ref}$ for the B-phase and the C-phase corresponding to the actual operation axis.

Similarly, when an error occurs in the B-phase, the coordinate conversion section 120 converts the two-phase operation commands $I_{B\text{-}1\_ref}$ and $I_{B\text{-}2\_ref}$ for the two-phase operation axis into commands $I_{A\_ref}$ and $I_{C\_ref}$ for the A-phase and the C-phase corresponding to the actual operation axis. Furthermore, when an error occurs in the C-phase, the coordinate conversion section 120 converts the two-phase operation commands $I_{C\text{-}1\_ref}$ and $I_{C\text{-}2\_ref}$ for the two-phase operation axis into commands $I_{A\_ref}$ and $I_{B\_ref}$ for the A-phase and the B-phase corresponding to the actual operation axis.

Then, the PI control section 130 of the inverter operating unit 100 performs PI control on the two-phase operation commands converted into the commands for the actual operation axis as expressed as Equation 4 below, and calculates two-phase operation voltages, at step S40.

[Equation 4]

$$I_{A\_ref}, I_{B\_ref}, I_{C\_ref} \rightarrow K_{p\_A,B,C} + \frac{K_{i,A,B,C}}{S} \rightarrow V_A, V_B, V_C$$

$$I_{B\_ref}, I_{C\_ref} \rightarrow K_{p\_B,C} + \frac{K_{i,B,C}}{S} \rightarrow V_B, V_C \quad (a)$$

$$I_{A\_ref}, I_{C\_ref} \rightarrow K_{p\_A,C} + \frac{K_{i,A,C}}{S} \rightarrow V_A, V_C \quad (b)$$

$$I_{A\_ref}, I_{B\_ref} \rightarrow K_{p\_A,B} + \frac{K_{i,A,B}}{S} \rightarrow V_A, V_B \quad (c)$$

Here, $I_{A\_ref}$, $I_{B\_ref}$, or $I_{C\_ref}$ represents a two-phase operation command converted into a command for an actual operation axis, and $V_A$, $V_B$, or $V_C$ represents an operating voltage applied to each phase. Furthermore, $K_{p\_A,B,C}$ represents a proportional control gain, and $K_{i\_A,B,C}$ represents an integral control gain.

In Equation 4, (a), (b), and (c) indicate cases in which an error occurs in the A-phase, the B-phase, and the C-phase, respectively.

At this time, the PI control is performed by open loop control. This is because the two-phase operation is limited so as not to generate a torque enough to perform feedback control.

In short, the PI control section 130 calculates the two-phase operation voltages for the actual operation axis based on the two-phase operation commands for the actual operation axis. At this time, the PI control section 130 may calculate a final two-phase operation voltage by reflecting reverse-electromotive-force feedforward compensation.

Meanwhile, when supposing that the motor 300 is a surface-mounted permanent magnet synchronous motor (SPMSM), a two-phase voltage governing equation of the motor 300 during the two-phase operation of the motor 300 will be expressed as Equation 5 below.

$$V_{as,bs} = R_s I_{as,bs} + \frac{d\lambda_{as,bs}}{dt} \quad \text{[Equation 5]}$$

Here, $V_{as,bs}$ represents a two-phase voltage, $I_{as,bs}$ represents a two-phase current, and $\lambda_{as,bs}$ represent a two-phase flux linkage.

Equation 5 may be expressed more specifically as Equation 6 below.

$$\begin{bmatrix} V_{as} \\ V_{bs} \end{bmatrix} = [R_s] \cdot \begin{bmatrix} I_{as} \\ I_{bs} \end{bmatrix} + \begin{bmatrix} L_{ts}+L_A & -\frac{1}{2}L_A \\ -\frac{1}{2}L_A & L_{ts}+L_A \end{bmatrix} \cdot \begin{bmatrix} I_{as} \\ I_{bs} \end{bmatrix} - \begin{bmatrix} \omega_r \phi_f \sin(\theta_r) \\ \overline{\omega_r} \phi_f \sin\left(\theta_r - \frac{2}{3}\pi\right) \end{bmatrix} \quad \text{[Equation 6]}$$

Here, $\Phi_f$ represents a flux applied to one phase of a stator from a magnet of a rotor in a synchronous motor, and $w_r$ represents an angular speed of rotation on the coordinate system of the rotor. The angular speed is a differential value of $\theta_r$, and the counterclockwise direction indicates a positive value.

When an error occurs in the A-phase, the two-phase voltage governing equation in the range of $0° < \theta \leq 90°$ or $270° < \theta \leq 360°$ may be calculated as expressed as Equation 7 below, and the two-phase voltage governing equation in the range of $90° < \theta \leq 270°$ may be calculated as expressed as Equation 8.

Even when an error occurs in the B-phase and the C-phase, the two-phase voltage governing equation may be calculated in the same manner.

$$\begin{bmatrix} V_{as} \\ V_{bs} \end{bmatrix} = [R_s] \cdot \begin{bmatrix} -\cos 30 \\ \cos 30 \end{bmatrix} \cdot [I_{A-1}] + \begin{bmatrix} L_{ts}+L_A & -\frac{1}{2}L_A \\ -\frac{1}{2}L_A & L_{ts}+L_A \end{bmatrix} \cdot \begin{bmatrix} -\cos 30 \\ \cos 30 \end{bmatrix} \cdot [I_{A-1}] - \begin{bmatrix} \omega_r \phi_f \sin\left(\theta_r - \frac{2}{3}\pi\right) \\ \overline{\omega_r} \phi_f \sin\left(\theta_r + \frac{2}{3}\pi\right) \end{bmatrix} \quad \text{[Equation 7]}$$

$$\begin{bmatrix} V_{as} \\ V_{bs} \end{bmatrix} = [R_s] \cdot \begin{bmatrix} -\cos 30 \\ \cos 30 \end{bmatrix} \cdot [I_{A-2}] + \begin{bmatrix} L_{ts}+L_A & -\frac{1}{2}L_A \\ -\frac{1}{2}L_A & L_{ts}+L_A \end{bmatrix} \cdot \begin{bmatrix} -\cos 30 \\ \cos 30 \end{bmatrix} \cdot [I_{A-2}] - \begin{bmatrix} \omega_r \phi_f \sin\left(\theta_r - \frac{2}{3}\pi\right) \\ \overline{\omega_r} \phi_f \sin\left(\theta_r + \frac{2}{3}\pi\right) \end{bmatrix} \quad \text{[Equation 8]}$$

That is, the PI control section 130 performs PI control so as to implement the two-phase voltage governing equations.

FIGS. 10A, 10B, and 10C illustrate the processes that, when an error occurs in the A-phase, the B-phase, and the C-phase, the PI control section 130 performs PI control from the two-phase operation commands of the two-phase operation axis and generates final two-phase operation voltages $V_B$ and $V_C$, $V_A$ and $V_C$, and $V_A$ and $V_B$, respectively.

Then, the PWM conversion section 140 of the inverter operating unit 100 converts the two-phase operation voltage calculated by the PI control section 130 into a PWM signal at step S50, and applies the converted PWM signal to the inverter unit 200 at step S60.

When the PWM method is used, the control may be delicately performed using the section where the voltage is '0'.

FIG. 11A illustrates an output current of the motor 300 when three phases are normal. FIG. 11B illustrates an output current of the motor 300 when an error occurs in any one of three phases and the two-phase operation is performed.

Referring to FIG. 11B, the inverter operating unit 100 restricts the output current of the motor 300 to a preset reference value or less when the PWM signal is applied to the inverter unit 200.

Therefore, when an error occurs in any one of three phases, the motor may provide a proper level of assist power such that a driver does not feel a different steering feeling.

In accordance with the method for operating a motor of an MDPS, although an error occurs in any one phase in the inverter circuit to operate the three-phase motor of the MDPS, a predetermined level of assist power may be maintained by the other two phases. Therefore, it is possible to prevent a driver from suddenly feeling a different steering feeling and secure the driving safety of the vehicle.

Furthermore, since a relay and a capacitor for blocking any one phase in which an error occurs in the inverter circuit can be removed, it is possible to reduce the cost. Furthermore, since the motor is driven by the PWM method, the control can be performed more delicately.

Furthermore, the embodiment of the present invention may be implemented only by changing software logic without an additional device. Furthermore, since ISO-26262 is satisfied from the point of view of the system, it is possible to improve the fail safe performance of the MDPS.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A method of operating a motor-driven power steering (MDPS) comprising a three-phase motor, the method comprising:
    generating, by at least one circuit, a two-phase operation command by projecting a Q-axis command onto a two-phase operation axis, when an error occurs in any one of three phases;
    converting, by at least one circuit, coordinates of the two-phase operation command into an actual operation axis;
    calculating, by at least one circuit, a two-phase operation voltage by performing a proportional integral (PI) control on the two-phase operation command converted into the actual operation axis; and
    operating, by at least one circuit, a motor by applying the two-phase operation voltage to an inverter unit.

2. The method of claim 1, wherein, in the generating of the two-phase operation command, the two-phase operation command is obtained based on two phases in which no errors occur among the three phases.

3. The method of claim 1, wherein, in the generating of the two-phase operation command, the two-phase operation command is obtained based on the rotation angle of a D-axis.

4. The method of claim 1, wherein, in the calculating of the two-phase operation voltage, the PI control is performed by an open loop control.

5. The method of claim 1, wherein, in the calculating of the two-phase operation voltage, the two-phase operation voltage is calculated by reflecting reverse-electromotive-force feedforward compensation into the result obtained by performing the PI control.

6. The method of claim 5, wherein the PI control and the reverse-electromotive-force feedforward compensation are performed based on a two-phase voltage equation of the motor.

7. The method of claim 1, wherein, in the operating of the motor, an assist power generated by the motor using the two-phase operation voltage is smaller than an assist power when all of the three phases are normal.

8. The method of claim 1, wherein, in the operating of the motor, the at least one circuit is configured to convert the two-phase operation voltage into a pulse width modulation (PWM) signal, and to apply the converted PWM signal.

9. The method of claim 1, wherein, in the operating of the motor, an output current of the motor is restricted to a predetermined reference value or less.

10. The method of claim 1, wherein the motor comprises a surface-mounted permanent magnet synchronous motor (SPMSM).

11. The method of claim 1, wherein the at least one circuit comprises an inverter operating unit.

12. A method of operating a motor-driven power steering (MDPS) system of a vehicle comprising a three-phase motor, the method comprising:
    monitoring three-phases of electric power supplied to the three-phase motor;
    upon identifying an error in one of the three phases, generating a two-phase operation command based on two phases in which no error has occurred;
    converting coordinates of the two-phase operation command into an actual operation axis;
    performing proportional integral (PI) control on the two-phase operation command to provide a two-phase operation voltage; and
    applying the two-phase operation voltage to an inverter connected to the motor.

* * * * *